(12) United States Patent
Knepple et al.

(10) Patent No.: US 11,339,917 B2
(45) Date of Patent: May 24, 2022

(54) INTEGRATED MASTER/SLAVE ACTUATOR FOR A PEDESTAL

(71) Applicant: Depatie Fluid Power Co., Portage, MI (US)

(72) Inventors: Robert Brian Knepple, Kalamzoo, MI (US); Adam Edward Jeffrey, Portage, MI (US); Chad Conway Souke, Vicksburg, MI (US)

(73) Assignee: Depatie Fluid Power Co., Portage, MI (US)

( * ) Notice: Subject to any disclaimer, the term of this patent is extended or adjusted under 35 U.S.C. 154(b) by 0 days.

(21) Appl. No.: 16/868,847

(22) Filed: May 7, 2020

(65) Prior Publication Data

US 2021/0048142 A1 Feb. 18, 2021

Related U.S. Application Data

(60) Provisional application No. 62/844,514, filed on May 7, 2019.

(51) Int. Cl.
*F16M 11/28* (2006.01)
(52) U.S. Cl.
CPC ....... *F16M 11/28* (2013.01); *F16M 2200/025* (2013.01)
(58) Field of Classification Search
CPC ............. F16M 11/28; F16M 2200/025; F16M 2200/02; F16M 2200/028; F16B 7/105; B66F 3/24; B66F 3/30; B66F 7/04; B66F 7/06; B66F 7/08; B66F 7/16; B66F 7/18; B66F 2700/05; B66F 2700/055

USPC ...................................................... 248/125.8
See application file for complete search history.

(56) References Cited

U.S. PATENT DOCUMENTS

| | | | | | |
|---|---|---|---|---|---|
| 1,455,224 | A | * | 5/1923 | Paoli | B66F 3/42 254/93 H |
| 1,799,298 | A | * | 4/1931 | Jakob | B66F 3/28 60/478 |
| 2,165,095 | A | * | 7/1939 | Frechette | B66F 3/24 91/4 R |

(Continued)

*Primary Examiner* — Christopher Garft
(74) *Attorney, Agent, or Firm* — Mark L. Maki; Miller Canfield

(57) ABSTRACT

A pedestal is provided having a telescoping column and an integrated master/slave actuator unit for a telescoping column of a pedestal-mounted support structure such as a surgical bucket, storage container, receptacle, utility tray, work surface, seat, equipment or automotive service rack, or other platform. The telescoping column preferably is vertically extendible and retractable by an actuator unit, which preferably is manually-actuated such as by being foot-actuated and vertically extendable to raise and lower the platform. The actuator unit is operated by an actuator pedal or other drive unit through an actuator stroke, which causes the column to raise and lower through a lift stroke. The actuator stroke is smaller than the lift stroke so that a small movement, such as by downward movement of the user's foot, allows the column to rise through an extended distance, i.e. the lift stroke. The actuator pedal may be actuated again, such as by being depressed downwardly, to unlock the column and allow the column to automatically retract preferably in response to the weight of the pedestal and gravity acting thereon.

21 Claims, 8 Drawing Sheets

(56) References Cited

U.S. PATENT DOCUMENTS

| | | | | |
|---|---|---|---|---|
| 3,047,269 A * | 7/1962 | Renshaw | B66F 3/30 |
| | | | 254/93 H |
| 4,094,484 A * | 6/1978 | Galione | B66F 3/24 |
| | | | 248/162.1 |
| 4,886,244 A * | 12/1989 | Renault | B66F 3/42 |
| | | | 254/93 H |
| 5,197,700 A * | 3/1993 | Chapman | F16M 11/28 |
| | | | 248/125.1 |
| 5,318,313 A * | 6/1994 | Chapman | B60G 99/00 |
| | | | 248/129 |
| 5,516,070 A * | 5/1996 | Chapman | B60G 99/00 |
| | | | 248/404 |
| 5,806,865 A * | 9/1998 | Chapman | F16M 11/42 |
| | | | 248/129 |
| 5,975,496 A * | 11/1999 | Hong | B66F 3/42 |
| | | | 254/2 R |
| 6,138,973 A * | 10/2000 | Woodward | A47C 3/26 |
| | | | 248/188.5 |
| 6,378,843 B1 * | 4/2002 | Hong | B66F 3/24 |
| | | | 254/134 |
| 7,171,807 B2 * | 2/2007 | Fox | B66F 3/24 |
| | | | 254/2 B |
| 8,066,247 B2 * | 11/2011 | Spera | E04G 11/50 |
| | | | 248/354.5 |
| 2005/0172793 A1 * | 8/2005 | Fox | B66F 3/24 |
| | | | 91/170 R |
| 2009/0237555 A1 * | 9/2009 | Katayama | F16M 11/18 |
| | | | 348/373 |
| 2014/0145042 A1 * | 5/2014 | Adamson | F16M 11/22 |
| | | | 248/125.8 |
| 2021/0048142 A1 * | 2/2021 | Knepple | F16M 11/18 |

\* cited by examiner

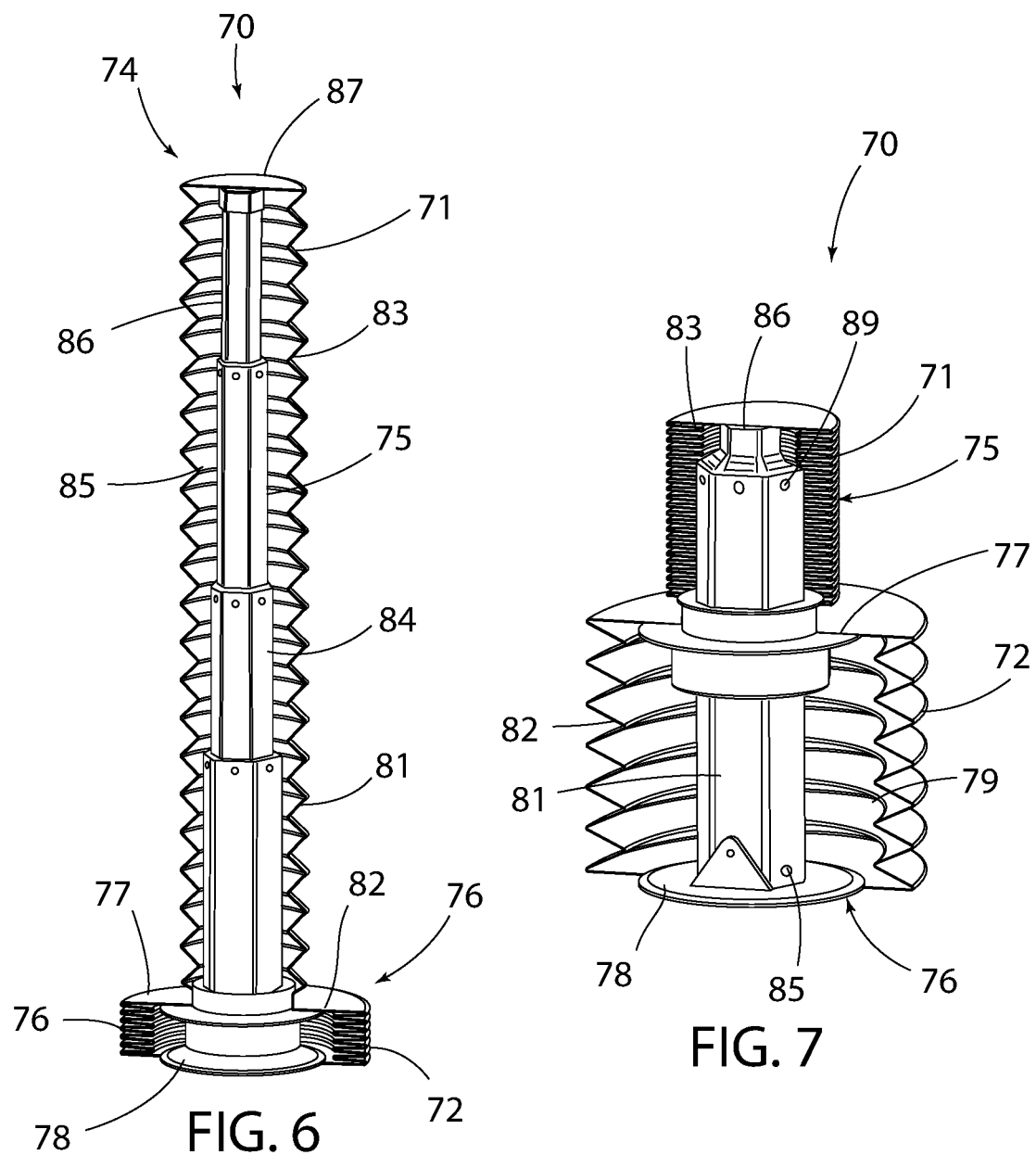

INTEGRATED MASTER/SLAVE ACTUATOR FOR A PEDESTAL

CROSS REFERENCE TO RELATED APPLICATIONS

This application claims priority of U.S. Provisional Application No. 62/844,514, filed May 7, 2019, the disclosure of which is incorporated herein by reference in its entirety.

FIELD OF THE INVENTION

The invention relates to an actuator for a telescoping column of a height-adjustable pedestal, which includes a support structure such as a storage container, receptacle, utility tray, work surface, seat, equipment or automotive service rack, or other platform, which said column may be manually-actuated.

BACKGROUND OF THE INVENTION

Many types of support structures use telescoping columns to raise and lower the support structure relative to a base surface such as a floor. The telescoping column may include column sections slidably joined together so as to extend and retract to raise and lower the height of the support structure, which for example could be a tray or seat or other platform. To maintain the column at a desired length or height, the column typically includes a lock mechanism such as a manual thumb screw to hold the column sections in a fixed position relative to each other to set the height of the support structure. In some designs, a hydraulic lifting mechanism may be provided which is actuated to lift the support structure and hold the support structure at a set elevation. Such lifting mechanisms can include a foot pedal, hand lever, hand crank or other manual actuator to raise and lower the telescoping column. Such mechanisms are commonly used to raise and lower various platforms such as containers, receptacles, seats, work surfaces and the like.

It is an object of the invention to provide an improved pedestal and telescoping column, which overcomes disadvantages associated with known column configurations.

SUMMARY OF THE INVENTION

The invention relates to a pedestal having a telescoping column and an actuator for a telescoping column supporting a pedestal-mounted support structure such as a storage container, receptacle, utility tray, work surface, seat, equipment or automotive service rack, or other platform. The telescoping column preferably is vertically extendible and retractable by an actuator unit, which preferably is manually-actuated such as by being foot-actuated wherein the telescoping column is vertically extendable to raise and lower the platform between raised and lowered heights, such as for use by a mechanic or other user. The actuator unit is operated by an actuator pedal or other drive unit, which is manually actuated such as by a foot through an actuator stroke, which causes the column to raise and lower through a lift stroke. The actuator stroke is smaller than the lift stroke so that a small movement, such as by downward movement of the user's foot, allows the column to rise through an extended distance, i.e. the lift stroke. The actuator pedal may be actuated again, such as by being depressed downwardly, to unlock the column and allow the column to automatically retract preferably in response to the weight of the pedestal and gravity acting thereon.

The actuator unit comprises a telescoping slave (output) cylinder with an integral master (input) cylinder wherein the slave and master cylinders are integrated so that movement of one moves the other. The master cylinder or input cylinder includes a master cylinder piston, which is in direct contact with and driven by the actuator unit, preferably formed as a foot pedal, which makes up the user interface. Depressing the pedal, moves the master cylinder piston downward. The master cylinder housing is fixed to the base of the unit and does not move relative to the base thereby creating a reduction in internal volume of the master cylinder chamber when the master cylinder piston moves downward in response to depression of the actuator pedal. This volumetric change displaces a hydraulic fluid within the master cylinder and communicates the fluid into an internal cavity of a slave cylinder or output cylinder via an integral connecting channel.

Consequently, as the master cylinder volume decreases, the fluid volume in the slave cylinder increases causing it to extend upward to expand the volume of the slave cylinder. The slave cylinder is defined by at least one and preferably, a plurality of telescoping cylinder segments wherein the uppermost segment can extend and retract to raise and lower a platform supported thereon. Each segment of the slave cylinder has integral stops on adjacent ends, which insure the segment cannot over extend or over retract which would cause cylinder failure. When the master cylinder piston reaches the end of its downward travel, it locks into position preventing the fluid from moving back from the slave cylinder into the master cylinder and thereby maintaining the position of the slave cylinder in the extended condition with the uppermost segment fully raised. To lower the unit, the actuator unit is activated, wherein in the preferred form of the actuator unit, the pedal is depressed again causing the master cylinder piston to unlock to then allow the master cylinder piston to rise and expand the master cylinder volume. When unlocked, the master cylinder volume increases to its initial volume allowing a return flow of fluid back to the master cylinder, and then each upper segment of the slave cylinder and the support structure of the pedestal lowers due to gravity which causes the slave cylinder to retract sending its fluid back to the master cylinder.

The actuator unit may also include outer bellows to reduce the necessity of seals between the telescoping cylinder segments.

Other objects and purposes of the invention, and variations thereof, will be apparent upon reading the following specification and inspecting the accompanying drawings.

BRIEF DESCRIPTION OF THE DRAWINGS

FIG. 6 is a cross-sectional side view of a column according to a second embodiment of the invention, which incorporates an exterior bellows in an extended condition.

FIG. 7 illustrates the column in a retracted condition.

FIGS. 9-11 each illustrate a cutaway side view showing the lock unit in this second embodiment being actuated to a locked condition wherein:

FIG. 9 illustrates a cylindrical lock collar in a first condition engaging a plate-like lock;

FIG. 10 illustrates the lock collar in a second condition engaging the lock; and FIG. 11 illustrates the lock collar in a third condition wherein the lock collar is lockingly engaged with the lock to hold the lock collar axially.

FIGS. 12-15 each illustrate a cutaway side view showing the lock unit in this embodiment being actuated to an unlocked condition wherein:

FIG. 12 illustrates the lock collar shift vertically relative to the lock for unlocking;

FIG. 13 illustrates the lock collar shifting upwardly relative to the lock during unlocking;

FIG. 14 illustrates the lock collar shifting upwardly as the locking collar continues unlocking from the lock; and FIG. 15 illustrates the lock collar vertically separated from the lock once unlocked.

Figure 1:
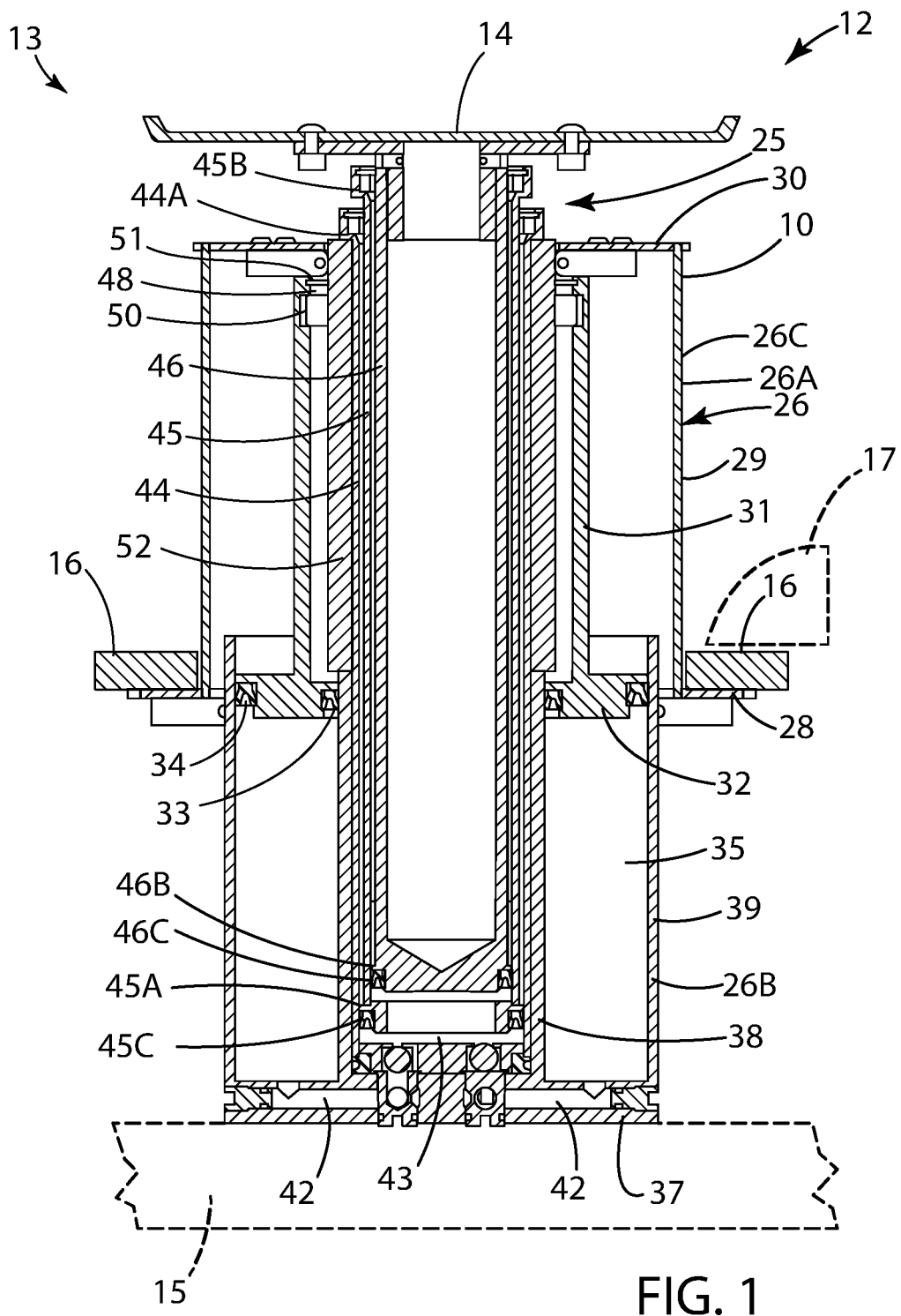
FIG. 1 illustrates a telescoping column with a support structure in the form of a storage container in a lowered or retracted condition.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
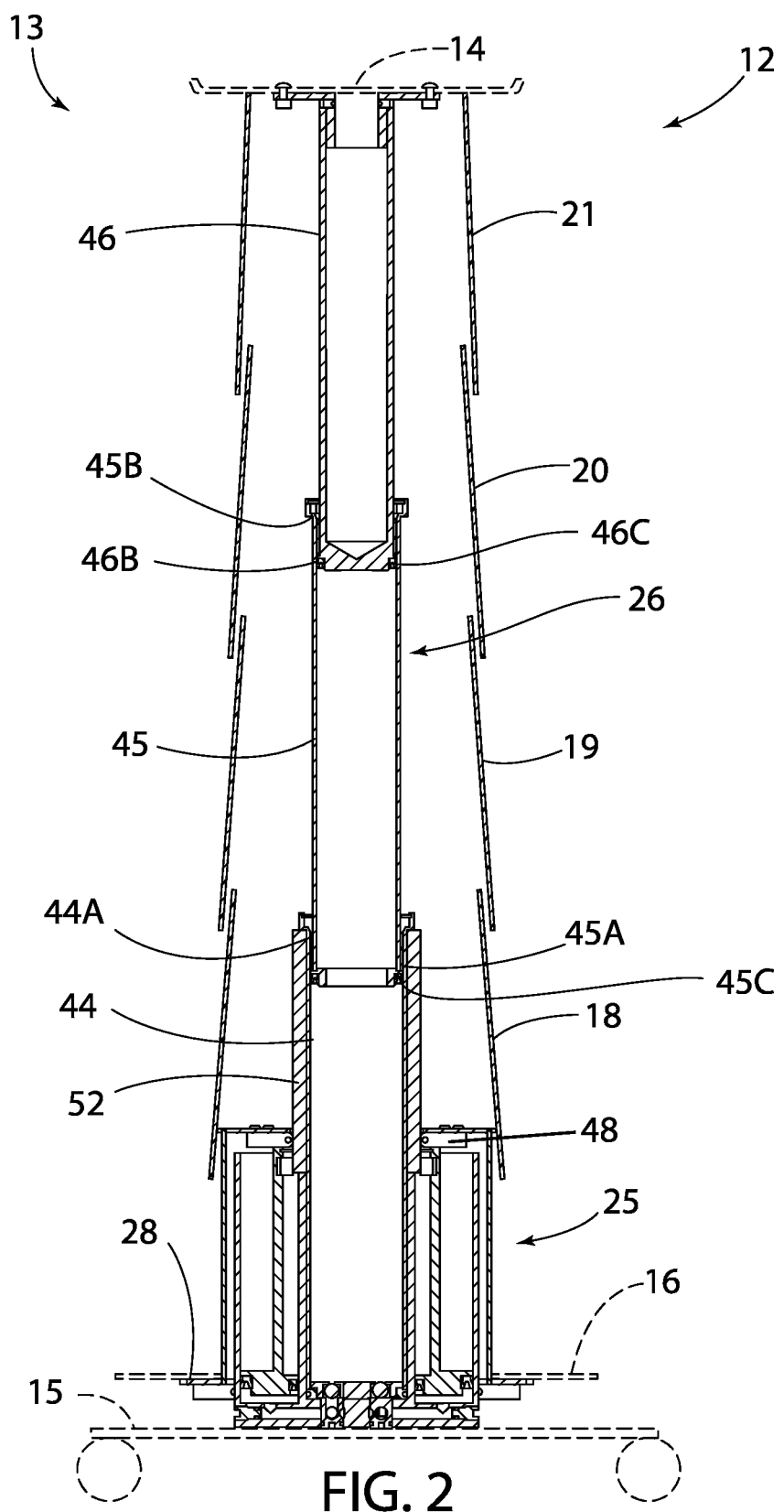
FIG. 2 illustrates the telescoping column in a raised or extended condition.

FIGS. 1 and 2 illustrate a telescoping column 10 in the form of a pedestal 13 supporting a support structured 12 in lowered and raised conditions respectively. The support structure 12 may be provided as a platform in different configurations such as a storage container, receptacle, utility tray, work surface, seat, equipment or automotive service rack, or other platform.

The invention relates to an internal actuator assembly for a telescoping column 10 of a storage container, receptacle or other platform 14 such as those identified above. The column 10 preferably is supported on a wheeled base 15 with the platform 14 supported on the upper end of the column 10 although the base 15 may omit wheels if desired. The base 15 includes a drive unit 16, preferably formed as one or more foot pedals or other manual or mechanical actuator units, wherein the drive unit can be formed as the drive pedal 16, which may in turn be depressed by the user's foot 17 or other appendage to raise the column 10 from the lowered condition in FIG. 1 to the raised condition in FIG. 2, in which the column 10 remains locked in place for use. The drive pedal 16 may again be depressed which unlocks the column 10 to allow the column 10 to retract and lower to the lowered condition of FIG. 2, wherein the platform 14 may still be used by the user. The column 10 may include one or more exterior, cylindrical housings 18-21, which telescopingly extend and retract as shown in FIG. 2 and enclose the internal actuator assembly typically for aesthetic purposes.

Figure 3:
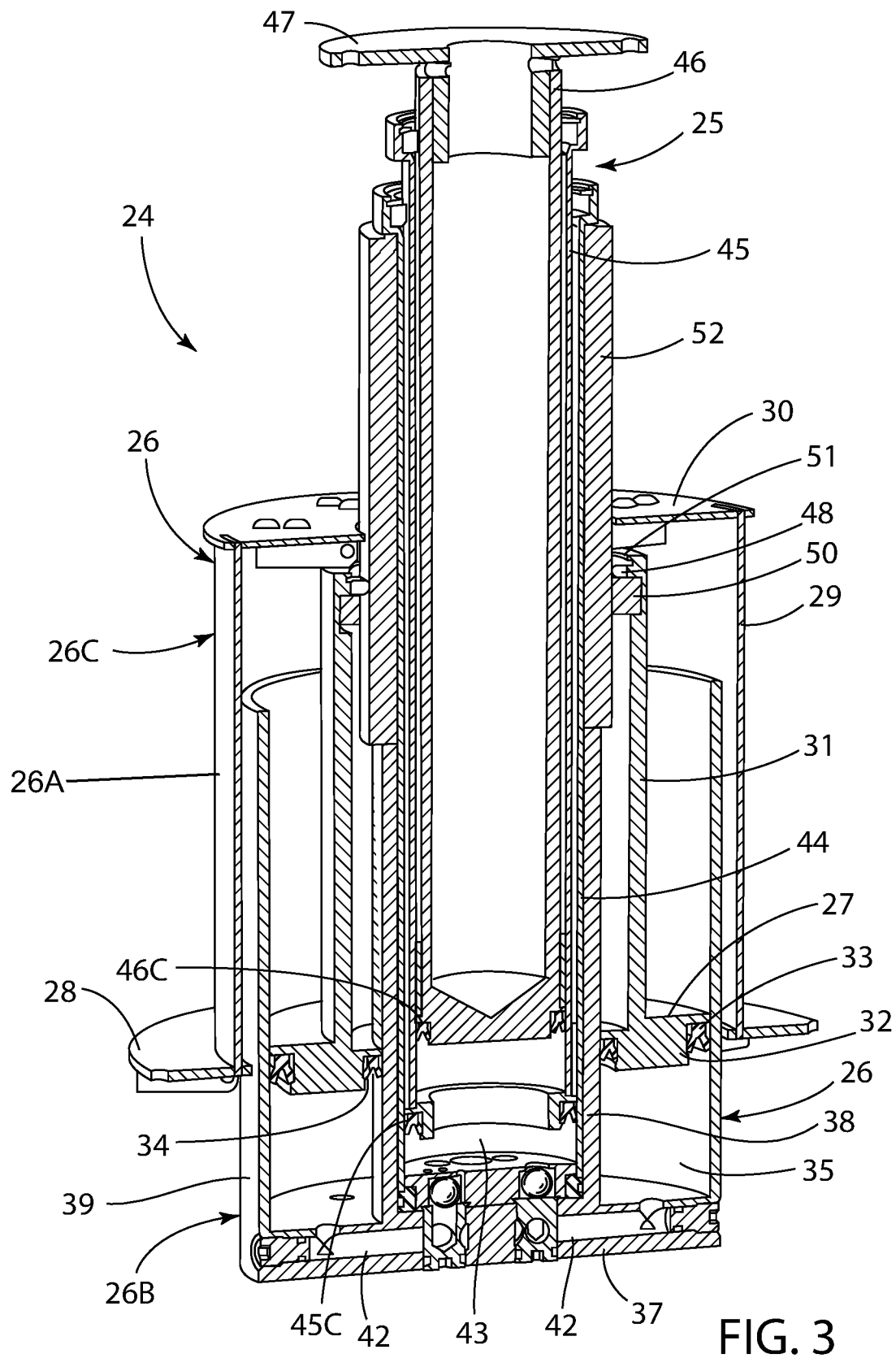
FIG. 3 is a cross-sectional side perspective view of the column in a first embodiment of the invention.

FIG. 3 is a cross-sectional side view of the column 10, which forms a first embodiment of the invention. The column 10 preferably is vertically extendible and retractable by an actuator unit 24, which preferably is foot-actuated by the actuator pedal 16 and vertically movable to raise and lower the platform 14 between the raised and lowered heights (FIGS. 1 and 2), such as for use by a mechanic, professional or other user. The actuator unit 24 is operated by the drive pedal or other drive unit 16, which preferably is foot actuated through an actuator stroke defined by the upper foot pedal position of FIG. 1 and the depressed foot pedal position of FIG. 2. In some embodiments, the actuator unit 24 and drive unit 16 may be formed with or driven by a mechanical actuator driven by a power source, or by a manual actuator driven by another appendage of a user such as a hand such that references to a foot pedal are not limited to actuation only by a foot and linear actuation may be accomplished by other mechanical and manual actuating configurations. Movement of the drive pedal 16 through the actuator stroke causes the column 10 to raise and lower through a lift stroke generally defined by the extended and retracted conditions of the column 10 shown in FIGS. 1 and 2.

The actuator stroke is smaller than the lift stroke so that a small movement of the user's foot 17 allows the column 10 to rise through an extended distance, i.e. the lift stroke. Once the drive pedal 16 is actuated and fully depressed, the column 10 locks in the raised condition to allow release or deactivation of the drive pedal 16. The actuator pedal or other drive unit 16 may be actuated or pressed downwardly again to unlock the column 10 and allow the column 10 to automatically retract, preferably in response to the weight of the pedestal 14 and gravity acting thereon.

Referring to FIG. 3, the actuator unit 24 comprises a telescoping slave (output) cylinder 25 with an integral master (input) cylinder 26. The master cylinder 26 includes a master cylinder piston 27 which is in direct contact with and driven by the actuator pedal 16 which preferably connects to a bottom cylinder plate 28 and thereby makes up the user interface. The master cylinder 26 is formed by a master cylinder housing 26A, which is formed by a stationary housing section 26B and a movable housing section 26C.

The movable housing section 26C comprises the bottom cylinder plate 28, outer wall 29 and top wall 30, which in turn connects to and drives an outer piston wall 31 and bottom piston body 32 vertically. The bottom piston body 32 is sealed radially by gaskets 33 and 34 to seal off a master piston chamber 35 having a variable volume. Depressing the drive pedal 16, moves the master cylinder piston 27 downwardly to reduce the master cylinder volume from the greater first volume of FIG. 1 to the smaller second volume of FIG. 2.

The stationary housing section 26B comprises a base body 37, which supports inner and outer walls 38 and 39 that support the movable housing section 26C to form the master cylinder chamber 35. The piston body 32 and gaskets 33 and 34 can slide vertically along the inner and outer walls 35 to vary the volume of the master piston chamber 35 as also shown in FIGS. 1 and 2.

The master cylinder housing 26A is fixed to the base 15 of the unit and does not move thereby creating a reduction in internal volume of the master cylinder chamber 35 when the master cylinder piston 27 moves downward in response to depression of the drive pedal 16. This volumetric change compresses and displaces a hydraulic fluid within the master cylinder chamber 35 and communicates the fluid into an internal cavity 43 of the slave cylinder 25 via one or more integral connecting channels 42. Consequently, as the master cylinder volume decreases, the fluid volume in the internal cavity 43 of the slave cylinder 25 receives the hydraulic fluid and the volume increases causing it and the connected column 10 to extend upward.

The slave cylinder 25 is defined by a plurality of telescoping cylinder segments 44-46 wherein the upper most segment 46 can extend and retract to raise and lower a pedestal 14 supported thereon by a mounting plate 47. The upper most segment 46 is generally hollow and tubular but is closed by a bottom end wall. Each segment 44-46 of the slave cylinder has integral stops 44A/45A and 45B/46B on both ends, which insure the segments 44-46 cannot over extend or over retract which would cause cylinder failure. Also, gaskets 45C and 46C are provided to seal the opposing surfaces of the segments 44-46. The gaskets 45C and 46C as well as gaskets 33 and 34 are generally C-shaped or U-shaped as defined by gasket legs that radially contact opposing cylinder surfaces and slide therealong. These gaskets 45C, 46C, 33 and 34 open toward their respective pressurized cylinder chambers so that the hydraulic fluid presses the legs radially outwardly to improve sealing contact with the cylinder surfaces.

The three segments 44-46 define a variable volume cylinder chamber 43 that expands and contracts as the segments 44-46 extend and retract. The slave cylinder chamber 43 extends vertically between the bottom end of the slave cylinder 26 and the bottom end wall of the upper segment 46. The total volume of hydraulic fluid in the column 10 remains generally constant or fixed and flows or travels between the master cylinder 26 and slave cylinder 25 through the connecting channels 42 so that contraction of the master cylinder 26 expands the slave cylinder 25 while expansion of the master cylinder 26 contracts the slave cylinder 25. The sum total of the volumes of the master cylinder 26 and slave cylinder 25 are substantially equal at any given moment.

When the master cylinder 26 reaches the end of its downward travel, it locks into position preventing the hydraulic fluid from moving back from the slave cylinder 25 into the master cylinder 26 through channels 42 and thereby maintaining the position of the slave cylinder 25 in the extended or raised condition with the uppermost segment 46 fully raised. To lower the unit, the drive pedal 16 is depressed again causing it to unlock to then allow the master cylinder piston 27 of the master cylinder 25 to rise and expand the master cylinder volume. When unlocked, the master cylinder volume increases to its initial volume, and then each upper segment 46 and 45 of the slave cylinder 25 and pedestal 14 lowers due to gravity which causes the slave cylinder 25 to retract sending its fluid back to the master cylinder 26.

Figure 4:
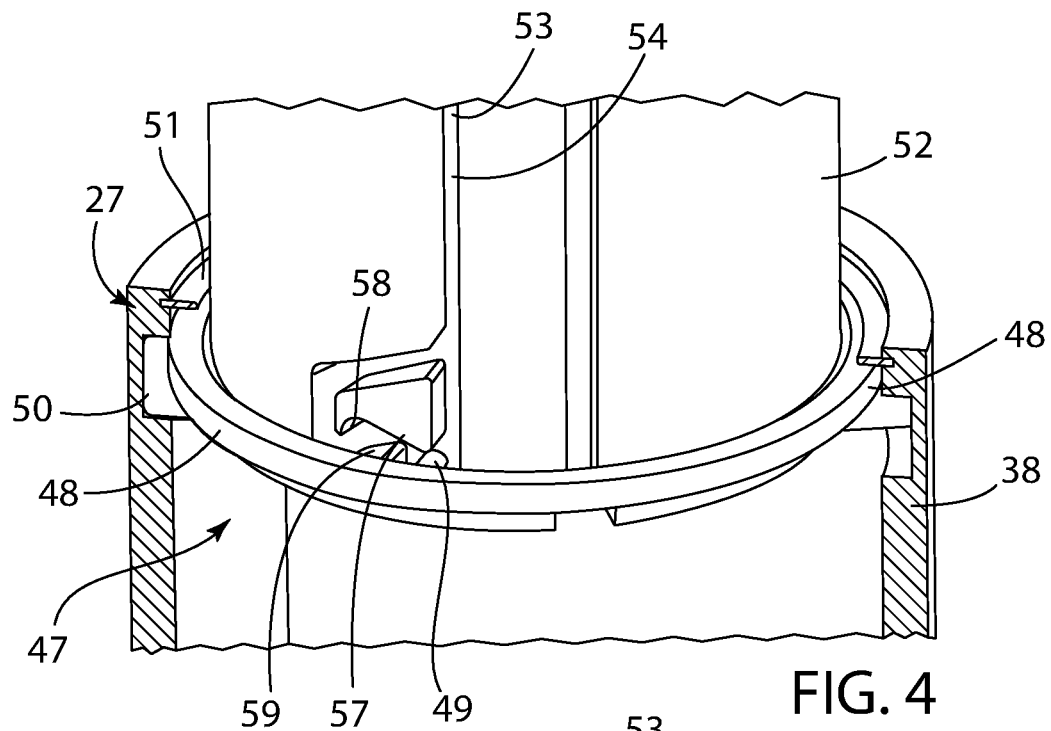
FIG. 4 is an enlarged partial view of a ring-like lock engaged with a central support column.

FIG. 4 illustrates a lock unit 47, which comprises a fixed lock structure and a movable lock structure, which are releasably lockable together. In this embodiment, the movable lock structure may be formed as a ring-like lock 48. FIG. 4 is an enlarged partial view of the ring-like lock 48 engaged with the master cylinder piston 27. The lock unit 47 serves to releasably lock the master cylinder housing 26A in the depressed position of FIG. 2 where the telescoping column 10 is extended, and is releasable by the actuator unit 24 to permit the master cylinder housing 26A to rise and the telescoping column 10 to retract. The lock 48 is rotatably supported on the piston wall 31 and includes a detent pin 49 serving as a lock pin. The lock 48 is captured axially between a bearing ring 50 and retaining ring 51 and can rotate and moves vertically with the master cylinder housing 26A.

The lock unit 47 also includes a fixed lock structure preferably formed as a lock cylinder 52, and the lock 48 engages with complementary locking formations on the lock cylinder 52, which extends vertically above the master cylinder wall 38, which remains stationary. The locking formations preferably are formed as a geometric slot formation 53 along which the detent pin 49 travels with the master cylinder piston 27 during vertical movement thereof. The slot formation 53 defines a geometric path that both allows free travel of the master cylinder piston 27 and activates and deactivates the lock unit 47 and the lock 48 thereof.

The slot formation 53 includes several slot sections including a free travel section 54, which receives the detent pin 49 during vertical sliding of the master cylinder piston 27 along its actuator stroke. When the master cylinder piston 27 reaches the bottom end of the actuator stroke by fully depressing the drive pedal 16 or otherwise activating the actuator unit 24, the detent pin 49 moves vertically and circumferentially along a first ramp 55 of the slot formation 53 and then seats vertically in a first recess 56 which defines a positive stop and provides detectable feedback to the actuator unit 24 and user thereof and indicates to the user to release the drive pedal 16. Hydraulic fluid pressure raises the master cylinder piston 27 a small extent vertically until the detent pin 49 hits a second ramp 57, which further rotates the lock 48 until the detent pin 49 seats vertically in a lock seat 58 so that the lock 48 is activated and holds the column 10 in the raised position. The lock cylinder 52 remains stationary as the lower cylinder segment 44 moves vertically, and the lock cylinder 52 holds the master cylinder housing 26A is the lowered position of FIG. 2 when the detent pin 49 is seated in the lock seat 58 so that the telescoping column 10 is held in the extended position of FIG. 2.

Figure 5:
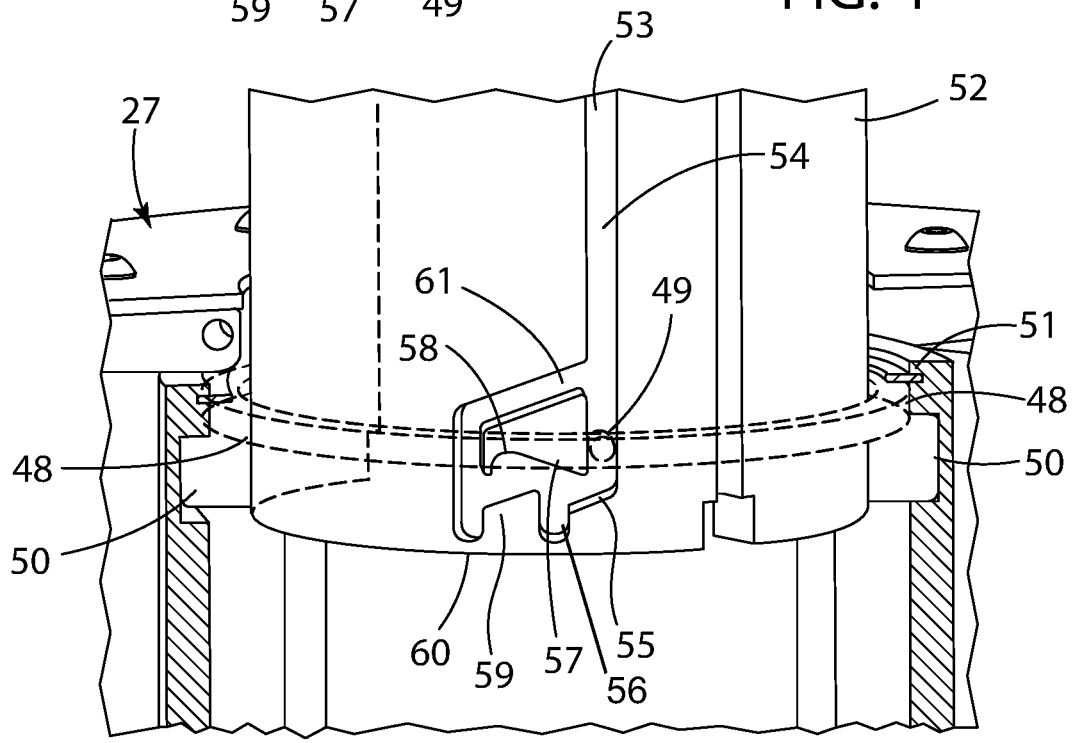
FIG. 5 is a further view of the lock engaged with a locking channel defining the operative locking and unlocking of the master cylinder in the lowered position.

To unlock, the drive pedal 16 is again depressed to lower the master cylinder piston 27 until the pin 49 hits a third ramp 59 seen in FIGS. 4 and 5 and rotates with the lock 48 to a second recess 60 to provide a second positive stop and provide detectable feedback to indicate to the user to stop pressing the drive pedal 16 since downward travel is prevented by the recess 60. When the drive pedal 16 is released, the master cylinder piston 27 automatically rises due to fluid pressure, whereby the detent pin 49 rises and strikes a third ramp or return ramp 61 to rotate the lock 48 as the pin 49 slides vertically and circumferentially along the return ramp 61 back to the free travel section 54 which extends vertically upwardly for a substantial length. Thereafter, the master cylinder piston 27 can automatically rise due to the hydraulic fluid pressure generated in the slave cylinder 25 by the weight of the slave cylinder components, pedestal 14 and any articles on the pedestal 14. Hydraulic fluid then flows back from the slave cylinder chamber 43 to the master cylinder chamber 35 through passages 42. This allows automatic lowering of the column 10 since the segments 44-46 can slide downwardly as the detent pin 49 moves upwardly along the linear free travel section 54 of the lock cylinder 52.

In this manner, the inventive telescoping column 10 can be raised to full extension by a much smaller displacement of the actuator unit 24, which requires a single input action over a distance significantly smaller than the total height which the column 10 may be extended.

Figure 8:
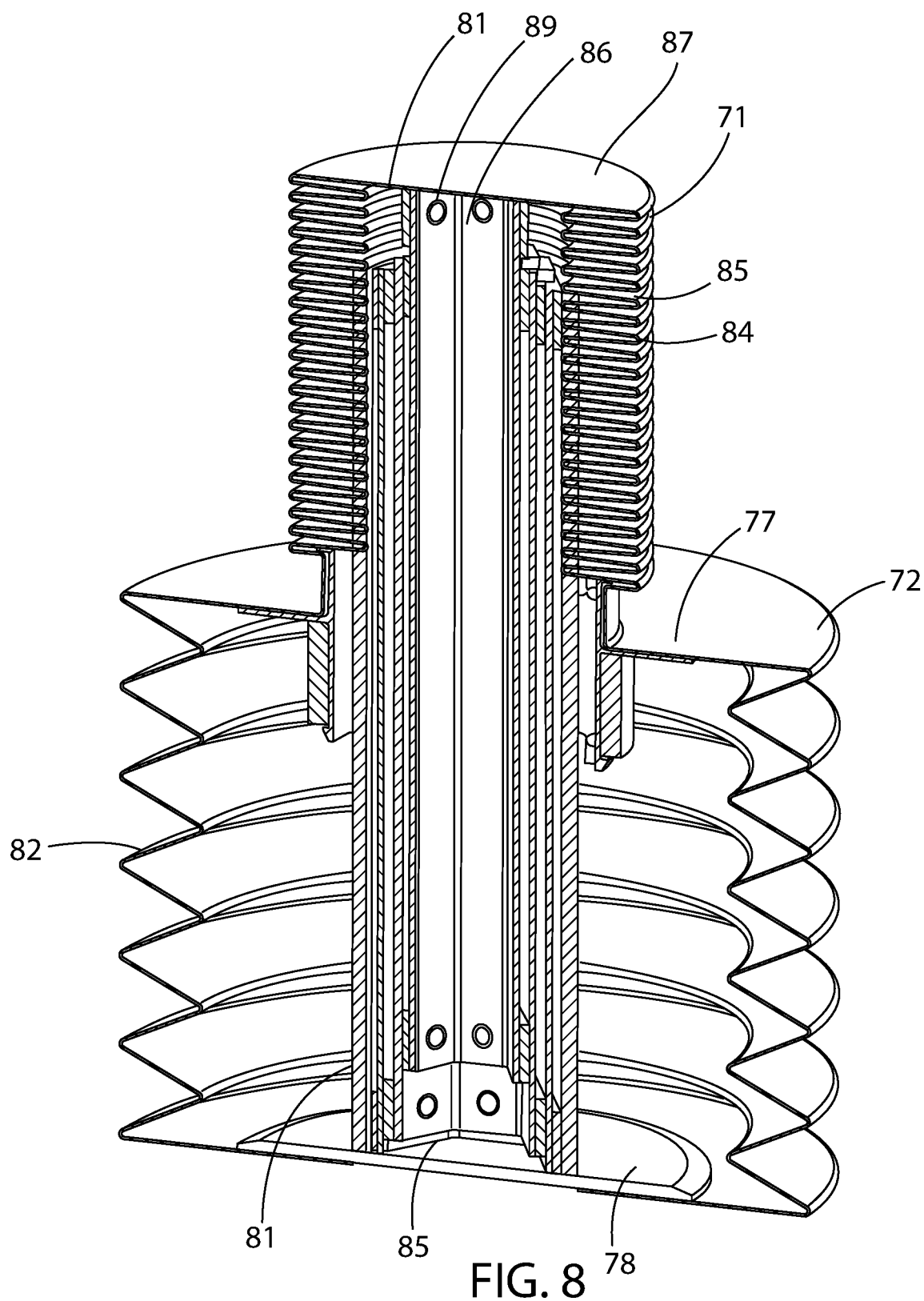
FIG. 8 is an enlarged view thereof.
Figure 9:
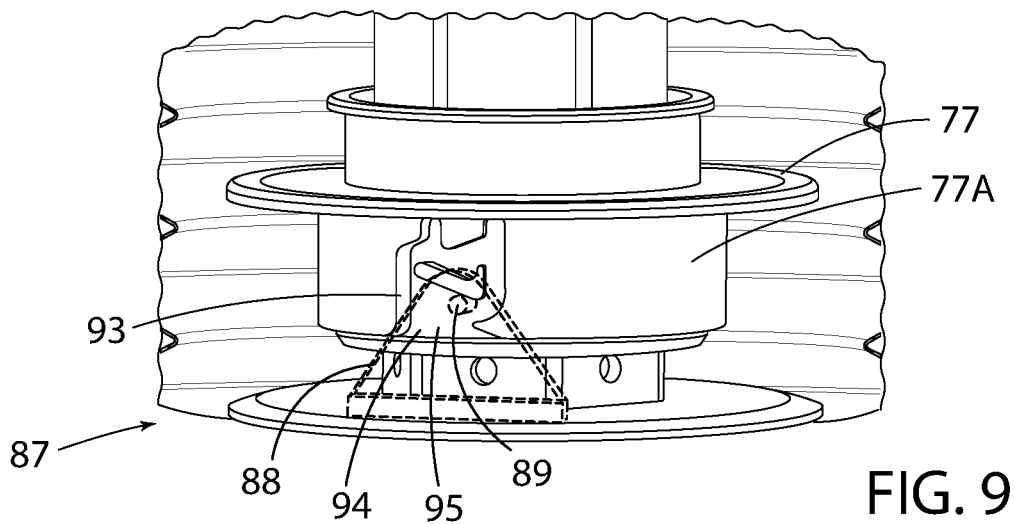
Figure 10:
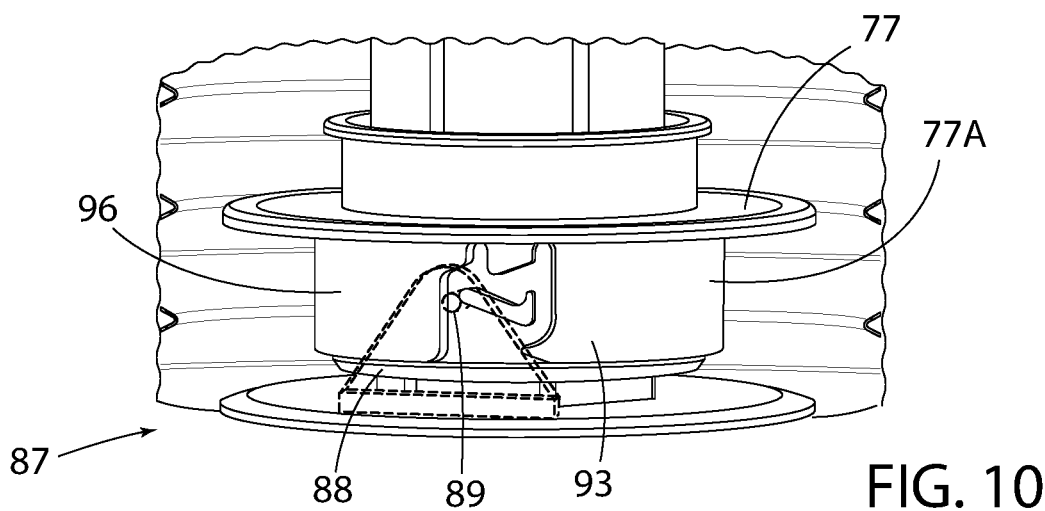
Figure 11:
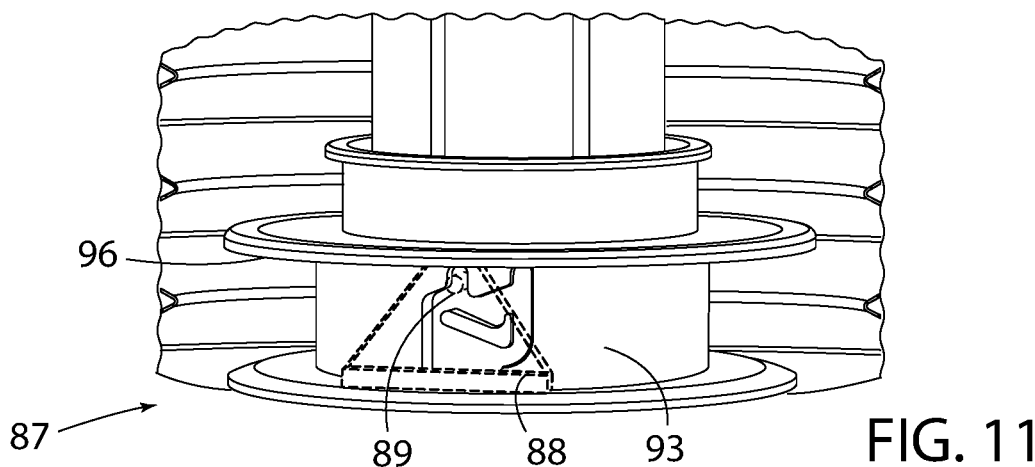

FIG. 6 is a cross-sectional side view of a telescoping column 70 according to a second embodiment of the invention. The telescoping column 70 is activated similar to the above-described telescoping column 10 and can be raised to full extension by a much smaller displacement or input, which requires a single input action over a distance significantly smaller than the total height, which the column 70 may be extended. The telescoping column 70 incorporates exterior bellows 71 and 72 shown in an extended condition in FIG. 6. FIG. 7 illustrates the column 70 in a retracted condition. FIG. 8 is an enlarged view thereof. FIGS. 9-11 each illustrate a cutaway side view showing this embodiment being actuated to a locked condition. FIGS. 12-15 each illustrate a cutaway side view showing this embodiment being actuated to an unlocked condition. The column 70 can be incorporated into the support structure 12 described above, and discussion of common parts is not required hereinafter.

Referring to FIGS. 6 and 7, the column 70 includes an actuator unit 74, which comprises a telescoping slave (output) cylinder 75 with an integral master (input) cylinder 76, which include the respective bellows 71 and 72 to enclose the exteriors thereof. The master cylinder 76 includes top and bottom piston plates 77 and 78 joined by the lower bellows 72 to form a master cylinder chamber 79 and essentially form a master cylinder piston 80, which is sealed from the pedestal exterior by the bellows 72. The bottom plate 78 fixedly supports a central wall 81, wherein the top plate 77 is formed as a piston collar that slides along the central wall 81. The master cylinder piston 80 is driven by pressing the top plate 77 downwardly with the actuator pedal 16 (not shown in FIGS. 6 and 7) which makes up the user interface.

The bottom piston plate 78 is fixed to the base 15 of the unit and does not move thereby creating a reduction in internal volume of the master cylinder chamber 79 when the top plate 77 moves downward in response to depression of the drive pedal 16. This volumetric change displaces a hydraulic fluid within the master cylinder chamber 79 and communicates the fluid into an internal cavity 82 of the slave cylinder 25 via one or more integral connecting passages 85 at the bottom of the master cylinder chamber 79. Consequently, as the master cylinder volume decreases, the fluid volume in the slave cylinder 75 increases causing it and the connected column 10 to extend upward.

The slave cylinder 75 is defined by a plurality of telescoping cylinder segments 84-86 wherein the upper most segment 86 can extend and retract to raise and lower a pedestal or platform 14 supported thereon by a mounting plate 87. Each segment 84-86 of the slave cylinder has integral stops on both ends, which insure the segment 84-86 cannot over extend or over retract which would cause cylinder failure. The segments 84-86 have an upper end of the bellows 71 joined thereto, wherein the lower end of the bellows 71 is sealingly joined to the master piston plate 77 to extend and retract therewith. The various segments 84-86 and the upper end of central wall 81 include ports or passages 89, which allow the pressurized fluid to flow into the region of the bellows 71.

When the master cylinder 76 reaches the end of its downward travel, it again locks into position preventing the fluid from moving back from the slave cylinder 75 into the master cylinder 76 through channels 85 and 89 and thereby maintaining the position of the slave cylinder 75 in the extended or raised condition with the uppermost segment 86 fully raised. To lower the unit, the drive pedal 16 is depressed again causing it to unlock to then allow the master cylinder 75 to expand the master cylinder volume. When unlocked, the master cylinder volume increases to its initial volume, and then each upper segment 84-86 of the slave cylinder 75 and pedestal 14 lowers due to gravity which causes the slave cylinder 75 to retract sending its fluid back to the master cylinder 76.

The telescoping cylinder 70 also includes a lock unit 87, which comprises a fixed lock structure and a movable lock structure. The fixed lock structure may comprise a plate-like lock 88 that is stationary. FIG. 9 is an enlarged partial view showing the plate-like lock 88 engaged with a collar 77A of the master cylinder top plate 77. The collar 77A forms a movable part of the lock unit 87 and serves as a movable lock structure. The lock 88 includes a detent pin 89 serving as a lock pin. The lock 88 is stationary and engages with complementary locking formations on the vertically movable collar 77A. The locking formations preferably are formed as a geometric slot formation 93 along which the detent pin 89 travels as the master cylinder collar 77A moves vertically. The slot formation 93 defines a geometric path that activates and deactivates the lock 88.

Figure 12:
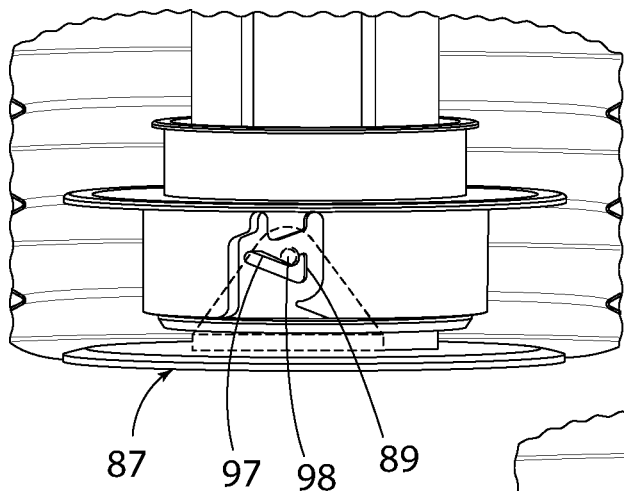
Figure 13:
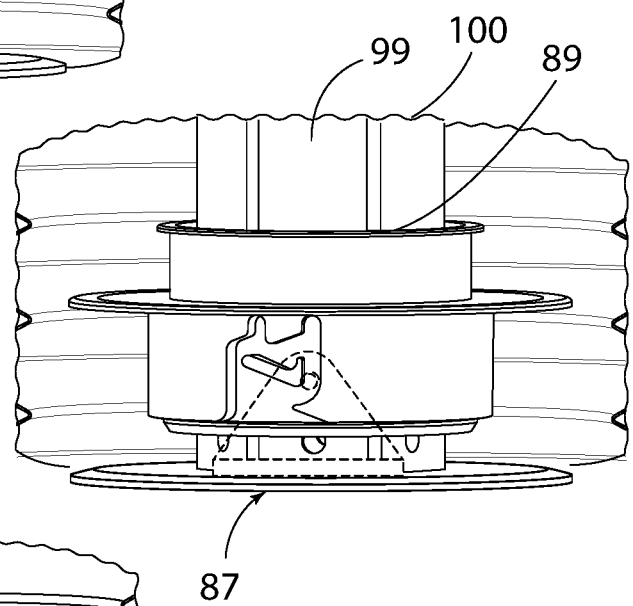
Figure 14:
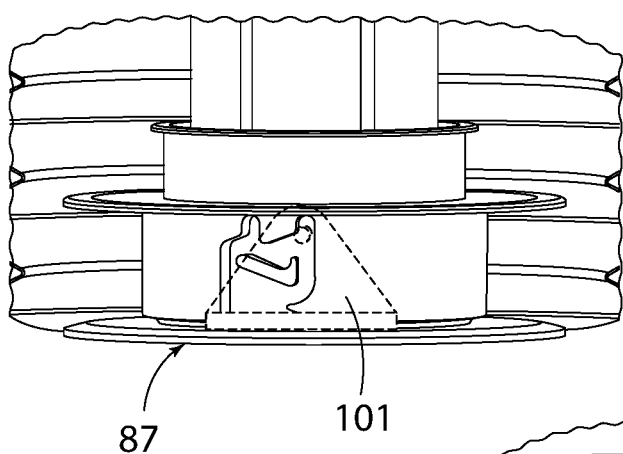
Figure 15:
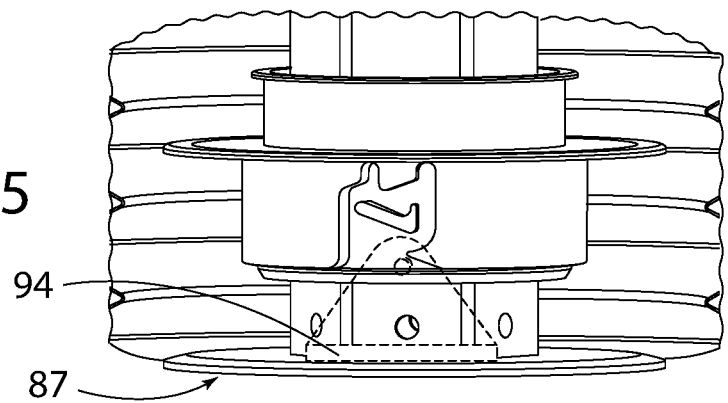

A free travel entry section 94 receives the detent pin 98 during vertical sliding of the master cylinder top plate 77 along the actuator stroke. When the master cylinder top plate 77 reaches the bottom end of the actuator stroke by fully depressing the drive pedal 16, detent pin 88 moves vertically and circumferentially along a first ramp 95 (FIG. 9) and then travels vertically (FIG. 10) and then travels vertically and circumferentially until it vertically seats in a first recess 96 (FIG. 11) which defines a first positive stop and indicates to the user to release the drive pedal 16. Hydraulic fluid pressure raises the master piston plate 77 a small extent until the detent pin 88 hits a second ramp 97, which rotates the piston top plate 77 until the detent pin 89 seats in a lock seat 98 as seen in FIG. 12 so that the lock 88 is activated and holds the column 10 in the raised position.

To unlock, the drive pedal 16 is again depressed to lower the master cylinder piston plate 77 until the pin 89 hits a third ramp 99 (FIG. 13) and rotates relative to the lock 88 to a second recess 100 (FIG. 13) to define a second positive stop and indicate to the user to stop pressing the drive pedal 16. When the drive pedal 16 is released, the master cylinder piston plate 77 automatically rises due to fluid pressure, whereby the lock collar 77 rises and the detent pin 89 strikes a further ramp or return ramp 101 (FIG. 14) to relatively rotate the lock 88 as the pin 89 slides along the return ramp 101 back to the free travel entry section 94. Thereafter, the master cylinder 76 can automatically rise due to the hydraulic fluid pressure generated in the slave cylinder 75 by the weight of the slave cylinder components, pedestal 14 and any articles on the pedestal 14. This allows automatic lowering of the column 10.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A telescoping column for supporting a support structure in lowered and raised positions, the telescoping column comprising:

an actuator unit comprised of a telescoping output cylinder formed integral with an input cylinder, said output cylinder comprising a plurality of telescoping segments which vertically telescope out of and retract into each other in response to movement of said input cylinder, said segments defining an output cylinder chamber having a first variable volume, wherein said input cylinder is movable between a first cylinder position in which said output cylinder is extended and a second cylinder position in which said output cylinder is retracted;

said input cylinder comprising:
a stationary cylinder housing and a movable input cylinder piston, which define an input cylinder chamber having a second variable volume, said input cylinder piston being movable between said first and second cylinder positions, wherein said output cylinder chamber and said input cylinder chamber fluidly communicate with each other through flow passages and are filled with a fluid that is flowable therebetween through said flow passages during movement of said input cylinder piston;
a drive unit that is selectively actuatable to cause a resultant displacement of said input cylinder piston to said first cylinder position, which reduces said second variable volume of said input cylinder chamber and increases said first variable volume of said output cylinder chamber to extend said segments, and releasable to permit automatic return of said input cylinder piston to said second cylinder position, which expands said input cylinder chamber and decreases said output cylinder chamber to retract said segments; and
a lock unit, which is selectively operable to lock said input cylinder piston in said first cylinder position in response to actuation of said drive unit and the resultant displacement of said input cylinder piston to said first cylinder position, which holds said segments extended, and to unlock said input cylinder piston in response to further actuation of said drive unit to permit said automatic return of said input cylinder by retraction of said segments.

2. The telescoping column according to claim 1, wherein said drive unit comprises an actuator pedal that is manually depressible to lock and unlock said lock unit.

3. The telescoping column according to claim 2, wherein, once said drive pedal is actuated and fully depressed in a first movement, said lock unit locks said output cylinder and said segments in the raised condition to allow release of said drive pedal, said lock unit being unlockable by further pressing of said drive pedal downwardly in a second movement wherein said drive pedal is then releasable to allow said telescoping column to automatically retract.

4. The telescoping column according to claim 1, wherein, when said input cylinder is unlocked and movable, said fluid is flowable from said output cylinder chamber to said input cylinder chamber in response to a weight of said segments and gravity acting thereon pushing said fluid through said passages back to said input cylinder chamber.

5. The telescoping column according to claim 1, provided in combination with said support structure.

6. The telescoping column according to claim 1, wherein said lock unit comprises first and second lock structures wherein one of said first and second lock structures is stationary and the other is movable with said input cylinder piston to releasably engage together when said input cylinder piston is in said second cylinder position.

7. The telescoping column according to claim 6, wherein said first lock structure comprises a lock pin and said second lock structure defines a geometric path along which said lock pin travels between first and second stop positions and a lock position therebetween, said first stop position defining a first stop to stop movement of said input cylinder piston and indicate release of a first actuation of said drive unit, wherein upon said release of said first actuation, said lock pin is automatically displaceable to said lock position to lock said input cylinder piston in said first cylinder position.

8. The telescoping column according to claim 7, wherein said lock position permits a second actuation of said drive unit until said second stop is reached to stop displacement of said input cylinder piston and indicate release of said second actuation of said drive unit, wherein upon said release of said second actuation, said lock pin is automatically displaceable away from said second stop position to unlock said input cylinder piston and permit automatic movement thereof to said second cylinder position.

9. A telescoping column for supporting a support structure in lowered and raised positions, the telescoping column comprising:
an actuator unit comprised of a telescoping output cylinder formed integral with an input cylinder;
said output cylinder including telescoping segments which are extendible and retractable so as to define a lift stroke, said segments defining an output cylinder chamber having a first variable volume that varies during movement of said segments through said lift stroke;
said input cylinder defining an actuator stroke between a first cylinder position in which said output cylinder is extended and a second cylinder position in which said output cylinder is retracted, said input cylinder further comprising:
a stationary cylinder housing and an input cylinder piston which is movable relative to said cylinder housing between said first and second cylinder positions during said actuator stroke to define an input cylinder chamber having a second variable volume which varies during movement of said input cylinder piston through said actuator stroke, said output cylinder chamber and said input cylinder chamber fluidly communicating with each other through flow passages and being filled with a fluid that is flowable therebetween through said flow passages;
a drive unit which is selectively actuatable to cause said input cylinder piston to move through said actuator stroke and cause said output cylinder to move through said lift stroke by fluid flowing from said output cylinder to said input cylinder, said drive unit being releasable to permit said input cylinder piston to move back through said actuator stroke in response to a weight of said segments retracting said segments back through said lift stroke and driving said fluid back to said input cylinder chamber; and
a lock unit engagable with said input cylinder piston to selectively lock said input cylinder piston in said first cylinder position in response to a first actuation of said drive unit and the resultant displacement of said input cylinder piston, and unlock said input cylinder piston in response to a second actuation of said drive unit to permit said automatic return of said input cylinder by retraction of said segments.

10. The telescoping column according to claim 9, wherein said locking of said input cylinder piston holds said segments in said extended position, and said unlocking permits said segments to retract by said fluid flowing from said output cylinder chamber to said input cylinder chamber.

11. The telescoping column according to claim 9, wherein said actuator stroke is smaller than said lift stroke so that a smaller movement of said drive unit allows said output cylinder to rise through said lift stroke.

12. The telescoping column according to claim 9, wherein said drive unit comprises an actuator pedal that is manually depressible to lock and unlock said lock unit.

13. The telescoping column according to claim 9, wherein, when said input cylinder is unlocked and movable, said fluid is flowable from said output cylinder chamber to said input cylinder chamber in response to a weight of said segments and gravity acting thereon pushing said fluid through said passages back to said input cylinder chamber.

14. The telescoping column according to claim 9, wherein said lock unit comprises first and second lock structures wherein one of said first and second lock structures is stationary and the other is movable with said input cylinder piston to releasably engage together when said input cylinder piston is in said second cylinder position.

15. The telescoping column according to claim 14, wherein said first lock structure comprises a lock pin and said second lock structure defines a geometric path along which said lock pin travels between first and second stop positions and a lock position therebetween, said first stop position defining a first stop to stop displacement of said input cylinder piston and indicate release of said first actuation of said drive unit, wherein upon said release of said first actuation, said lock pin is automatically displaceable to said lock position to lock said input cylinder piston in said first cylinder position.

16. The telescoping column according to claim 15, wherein said lock position permits further actuation of said drive unit until said second stop is reached to stop displacement of said input cylinder piston and indicate release of said second actuation of said drive unit, wherein upon said release of said second actuation, said lock pin is automatically displaceable away from said second stop position to unlock said input cylinder piston and permit automatic movement thereof to said second cylinder position.

17. A telescoping column for supporting a support structure in lowered and raised positions, the telescoping column comprising:
an actuator unit comprised of a telescoping output cylinder provided together with an input cylinder, said output cylinder comprising a plurality of telescoping segments which vertically telescope out of and retract into each other in response to movement of said input cylinder, said segments defining an output cylinder chamber having a variable first volume and including a gasket between each relatively movable pair of said segments to permit relative sealed sliding of said segments to vary said first volume without leakage;
said input cylinder comprising:
a stationary cylinder housing having inner and outer housing walls wherein said inner wall receives said segments therein and forms part of said output cylinder chamber, said outer wall being radially spaced from said inner wall to form an input cylinder chamber radially therebetween;
a movable input cylinder piston received in said input cylinder chamber and having inner and outer gaskets sealingly engaged with said inner and outer housing walls, said input cylinder piston being movable within said input cylinder chamber to define a second volume which is variable, said input cylinder piston being movable between first and second cylinder positions to vary said second volume, wherein said output cylinder chamber and said input cylinder chamber fluidly communicate with each other through flow passages and are filled with a fluid that is flowable therebetween through said flow passages during movement of said input cylinder piston; and
a drive unit which is selectively actuatable to cause a resultant displacement of said input cylinder piston to said first cylinder position, which reduces said second volume of said input cylinder chamber and increases said first volume of said output cylinder chamber to extend said segments, and releasable to permit automatic return of said input cylinder piston to said second cylinder position, which expands said input cylinder chamber and decreases said output cylinder chamber to retract said segments.

18. The telescoping column according to claim 17, which further includes a lock unit, which is selectively operable to lock said input cylinder piston in said first cylinder position in response to actuation of said drive unit and the resultant displacement of said input cylinder piston to said first cylinder position, which holds said segments extended, and to unlock said input cylinder piston in response to further actuation of said drive unit to permit said automatic return of said input cylinder by retraction of said segments.

19. An actuator unit comprising:
an output device having an output chamber for receiving hydraulic fluid;
an input cylinder comprising a stationary cylinder housing and an input cylinder piston which is movable relative to said cylinder housing between first and second cylinder positions to define an input cylinder chamber having a variable volume which varies during movement of said input cylinder piston through an actuator stroke, said output chamber and said input cylinder chamber fluidly communicating with each other through flow passages and being filled with said fluid that is flowable therebetween through said flow passages;
a drive unit which is selectively actuatable to cause said input cylinder piston to move through said actuator stroke; and
a lock unit engagable with said input cylinder piston to selectively lock said input cylinder piston in said first cylinder position in response to a first actuation of said drive unit and the resultant displacement of said input cylinder piston, and unlock said input cylinder piston in response to a second actuation of said drive unit to permit said automatic return of said input cylinder;
said lock unit comprising first and second lock structures wherein one of said first and second lock structures is stationary and the other is movable with said input cylinder piston to releasably engage together when said input cylinder piston is in said second cylinder position, said first lock structure comprising a lock pin and said second lock structure defining a geometric path along which said lock pin travels between first and second stop positions and a lock position therebetween, said first stop position defining a first stop to stop displacement of said input cylinder piston and indicate release of said first actuation of said drive unit, wherein said lock pin is automatically displaceable to said lock position to lock said input cylinder piston in said first cylinder position.

20. The actuator unit according to claim 19, wherein said lock position permits said second actuation of said drive unit until said second stop is reached to stop displacement of said input cylinder piston and indicate release of said second actuation of said drive unit, wherein said lock pin is automatically displaceable away from said second stop position to unlock said input cylinder piston and permit automatic movement thereof to said second cylinder position.

21. The actuator unit according to claim 19, wherein said output device includes telescoping segments which are extendible and said locking of said input cylinder piston holds said segments in said extended position, and said unlocking permits said segments to retract by said fluid flowing from said output chamber to said input cylinder chamber.

* * * * *